(12) United States Patent
Mack et al.

(10) Patent No.: US 6,198,485 B1
(45) Date of Patent: *Mar. 6, 2001

(54) METHOD AND APPARATUS FOR THREE-DIMENSIONAL INPUT ENTRY

(75) Inventors: Walter J. Mack, Chandler, AZ (US); Jean C. Korta; Ernie R. Hirt, both of Mesa, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/123,965

(22) Filed: Jul. 29, 1998

(51) Int. Cl.[7] .............................. G06T 15/00; G09G 5/00
(52) U.S. Cl. ............................................. 345/419; 345/156
(58) Field of Search ........................... 345/127, 156–158, 345/161, 419, 7, 473; 395/119

(56) References Cited

U.S. PATENT DOCUMENTS

| 4,935,728 | * | 6/1990 | Kley et al. | 345/127 X |
|---|---|---|---|---|
| 5,305,012 | * | 4/1994 | Faris | 345/7 |
| 5,616,078 | * | 4/1997 | Oh | 345/156 |
| 5,636,334 | * | 6/1997 | Hidaka | 395/119 |
| 5,748,199 | * | 5/1998 | Palm | 345/473 |
| 5,818,424 | * | 10/1998 | Korth | 345/156 |
| 6,064,354 | * | 5/2000 | DeLuca | 345/7 |

\* cited by examiner

*Primary Examiner*—Mark R. Powell
*Assistant Examiner*—Chanté E. Harrison
(74) *Attorney, Agent, or Firm*—Blakely, Sokoloff, Taylor & Zafman LLP

(57) ABSTRACT

The present invention is directed to a method and apparatus for providing three-dimensional (3-D) input data to a computer. A marker is moved in a 3-D work place. The marker has at least one unique feature distinctive from other objects in the 3-D work place. The movement of the marker in the 3-D work place is sensed by at least two sensors in a stereo imaging geometry to produce stereo images containing the marker. The stereo images are processed to produce marker images. The 3-D coordinates of the marker are computed from the marker images to provide the 3-D input data to the computer.

35 Claims, 6 Drawing Sheets

METHOD AND APPARATUS FOR THREE-DIMENSIONAL INPUT ENTRY

BACKGROUND OF THE INVENTION

1. Field of the Invention

This invention relates to computer systems. In particular, the invention relates to three-dimensional (3-D) input entry devices.

2. Description of Related Art

Three-dimensional (3-D) graphic and imaging systems have been popular for a number of years. High performance processors with 3-D capabilities have been developed for 3-D applications such as animation, visualization, games, and education.

In many interactive 3-D applications, the user needs to interact with the system in a 3-D world. The traditional input entry devices, e.g., mice, tablet digitizers, track balls, only provide two-dimensional (2-D) input information. For example, in a 3-D system having three coordinates (x, y, z), the 2-D input information includes only the (x, y) coordinates. The depth information (the z-dimension) is usually missing. The input data, therefore, does not represent sufficient information to fully utilize the 3-D world as generated or processed by the graphics or imaging programs.

There are a number of ways to process 3-D information in the system. The simplest way is to assume that the depth dimension is constant. In essence, this method ignores the depth information or assigns a predetermined depth dimension. This method is undesirable because it does not provide the user the means to change the depth dimension. Another way is to convert the 3-D world from the program to a 2-D world as seen by the user and process the 2-D input on this 2-D remapped world. This method introduces ambiguity in processing the data. Another way is to provide 3-D input devices and/or subsystems used in virtual reality systems such as gloves, head-mounted display. This method is expensive and requires complex hardware modifications.

Therefore, there is a need in the technology to provide a simple and efficient method to navigate in 3-D worlds.

SUMMARY OF THE INVENTION

The present invention is directed to a method and apparatus for providing three-dimensional (3-D) input data to a computer. A marker is moved in a 3-D work place. The marker has at least one unique feature distinctive from other objects in the 3-D work place. The movement of the marker in the 3-D work place is sensed by at least two sensors in a stereo imaging geometry to produce stereo images containing the marker. The stereo images are processed to produce marker images. The 3-D coordinates of the marker are computed from the marker images to provide the 3-D input data to the computer.

BRIEF DESCRIPTION OF THE DRAWINGS

The features and advantages of the present invention will become apparent from the following detailed description of the present invention in which.

DESCRIPTION OF THE PRESENT INVENTION

The present invention discloses a method and apparatus for navigating 3-D worlds. The technique uses stereo imaging to capture the 3-D information of a marker on the user hand. The 3-D coordinates of the marker are computed using 3-D camera geometry. Other markers including facial expressions, head and eye movements can also be used as 3-D input data. The invention provides a means for user to navigate the 3-D world as processed by the computer.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
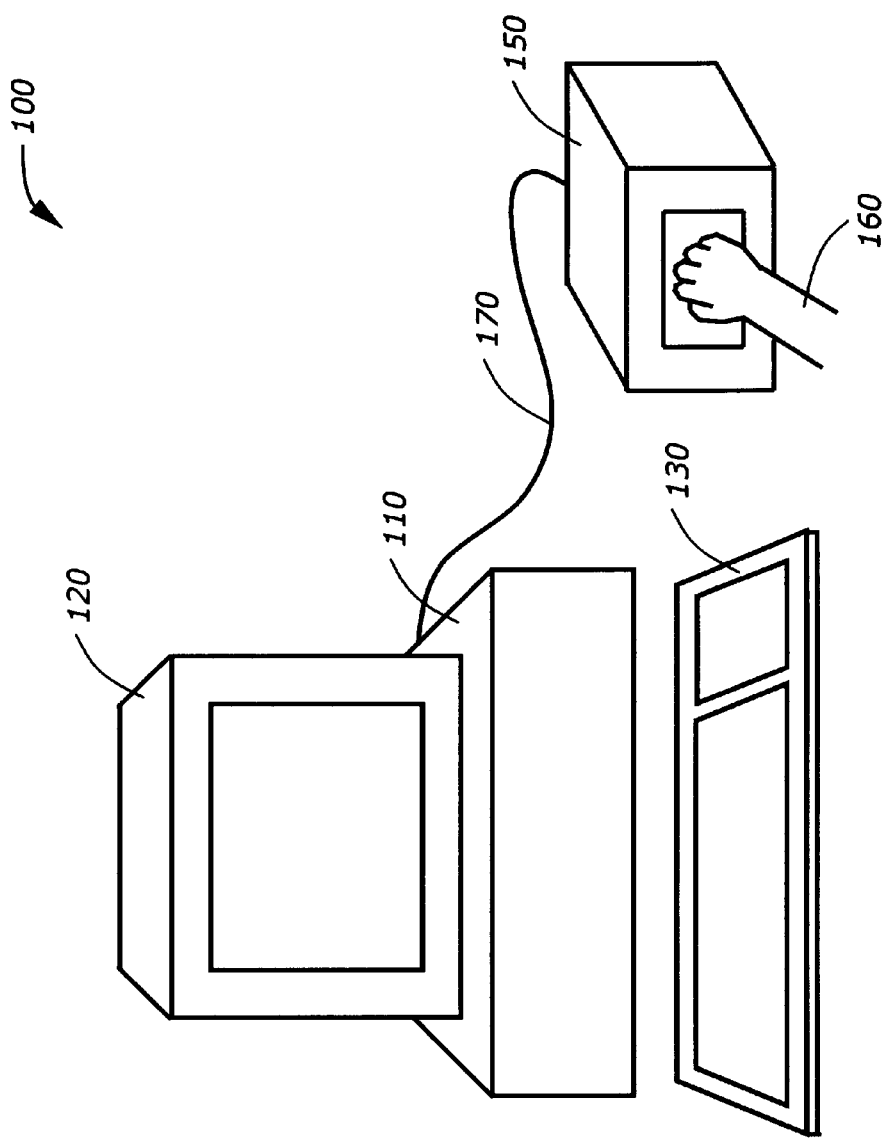
FIG. 1 is a diagram illustrating one embodiment of a system in accordance with the teachings of the invention.

FIG. 1 is a diagram illustrating one embodiment of a system in accordance with the teachings of the invention. The system 100 includes a computer 110, a display monitor 120, a keyboard 130, an input unit 150 adapted for a user hand 160, and an interface cable 170.

The computer 110 is loaded with a 3-D processing program such as 3-D animation, game, education, and visualization. In one embodiment, the computer 110 is based on a high performance microprocessor, such as any type of Intel® microprocessor architecture. The computer 110 typically has interfaces to one or more input/output (I/O) devices such as display monitor 120, keyboard 130, mouse, and tablet digitizer. In one embodiment, the computer 110 has interfaces to the input unit 150 for receiving 3-D information.

The display monitor 120 displays the 3-D graphic or image data as processed by the computer 110. The display monitor 120 is any monitor, including cathode ray tube (CRT), a flat panel display, etc. The keyboard 130 provides key data entry to the computer 110. The keyboard 130 may also include other entry devices such as track ball and mouse pad.

The input unit 150 provides a housing for the 3-D input system which provides a work area for the user hand 160. In one embodiment, the input unit 150 includes a stereo camera system to determine the 3-D coordinates of a marker manipulated by the user. In this stereo imaging system, two cameras are installed inside the input unit 150. As is known by one skilled in the art, other configurations may be employed to provide stereo images. Examples of other configurations include those with more than two cameras or one camera occupying two locations. A light source illuminates the marker to be imaged by the stereo cameras. The marker can be conveniently worn on the user's finger. In this embodiment, for example, the input unit 150 includes a closed enclosure to avoid scattering of emitted light. If the light source is strong enough to enable the image capture of the marker, the enclosure may be partially open or even completely open. The input unit 150 is interfaced to the computer 110 via a communication interface cable 170.

The input unit 150 may be implemented as a stand-alone input unit or as a peripheral to the computer 110. In a stand-alone configuration, the input unit 150 has its own processor to performs the 3-D calculations and transmits the computed 3-D data to the computer 110 via the interface cable 170 In a peripheral configuration, the input unit 150 transmits the sensed information to the computer 110. As will be illustrated later, one type of sensor to be used in the input unit 150 is the camera. The information as generated by the camera is transmitted to the computer 110 via the cable 170. If the camera is a video camera generating video signal, the cable 170 will be a video cable. If the camera is a digital camera which can generate digital information directly, the cable 170 may be a digital cable connected to the computer 110 via a communication interface port such as a serial, parallel, or universal serial bus (USB) port.

Figure 2:
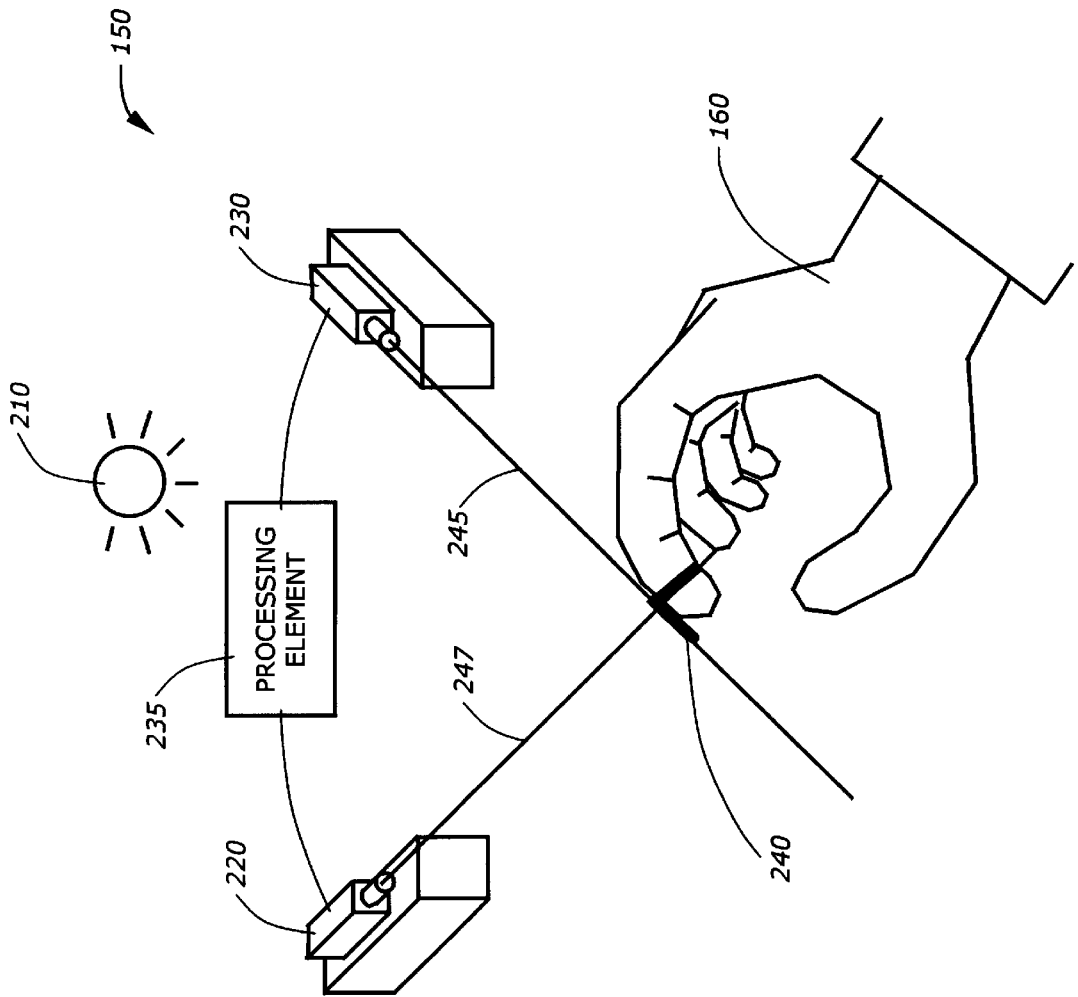
FIG. 2 is a diagram illustrating a 3-D stereo vision for inputting hand motion according to one embodiment of the invention.

FIG. 2 is a diagram illustrating a 3-D stereo vision inside the input unit 150 for inputting hand motion according to one embodiment of the invention. The input unit 150 includes a light source 210, two cameras 220 and 230, a processing element 235, and a marker 240.

The light source 210 is any convenient light source to provide sufficient light for the camera. In one embodiment, the light source is mounted inside an enclosed housing and is powered by any convenient power supply including the computer supply via the connection cable. In another embodiment, the light source is any light source in the work space of the user.

The two cameras 220 and 230 are any camera that can capture images of a moving object in real-time. Depending on the type of marker to be used, the cameras may capture gray level or color images. In one embodiment, the cameras 220 and 230 are video cameras that can operate with low ambient light. The two cameras 220 and 230 are positioned to point to the work space of the user hand 160. The work space of the user hand 160 defines the 3-D space that the system can accept. The two cameras are preferably positioned according to a stereo imaging geometry as shown in FIG. 2. The stereo imaging geometry allows the computation of the 3-D coordinates of the object.

The processing element 235 receives the stereo images from the two cameras 220 and 230 and processes the stereo images to produce the marker images which contain the images of the marker from two stereo positions. The processing element 235 may be located inside the input unit 150 or as part of the computer 110. If the cameras 220 and 230 are analog cameras sending out video signals, the processing element 235 may include a video-to-digital converter such as a frame grabber to convert the analog video signal into digital data. If the cameras 220 and 230 are digital cameras, the processing element 235 can process the image data directly. The processing element 235 may contain memory to store the image data and a processor with some computational power to process the image data.

The marker 240 is any convenient object that is used to facilitate the detection of the movement of the user's hand or finger. In one embodiment, the marker 240 is a specially designed object that can be worn at the tip of the user's finger. The marker 240 has unique features so that the processing of the images captured by the two cameras 220 and 230 can be performed quickly to identify the marker 240. Examples of these unique features include color, shape, type of material, etc. If the marker 240 has some unique color, the camera imaging can be filtered by the appropriate color filter to separate the marker from other objects in the scene. The marker 240 is located at the intersection lines 245 and 247 from the two cameras 230 and 220, respectively. As will be explained later, the 3-D coordinates of the marker 240 are determined by solving equations of the lines 245 and 247.

Figure 3:
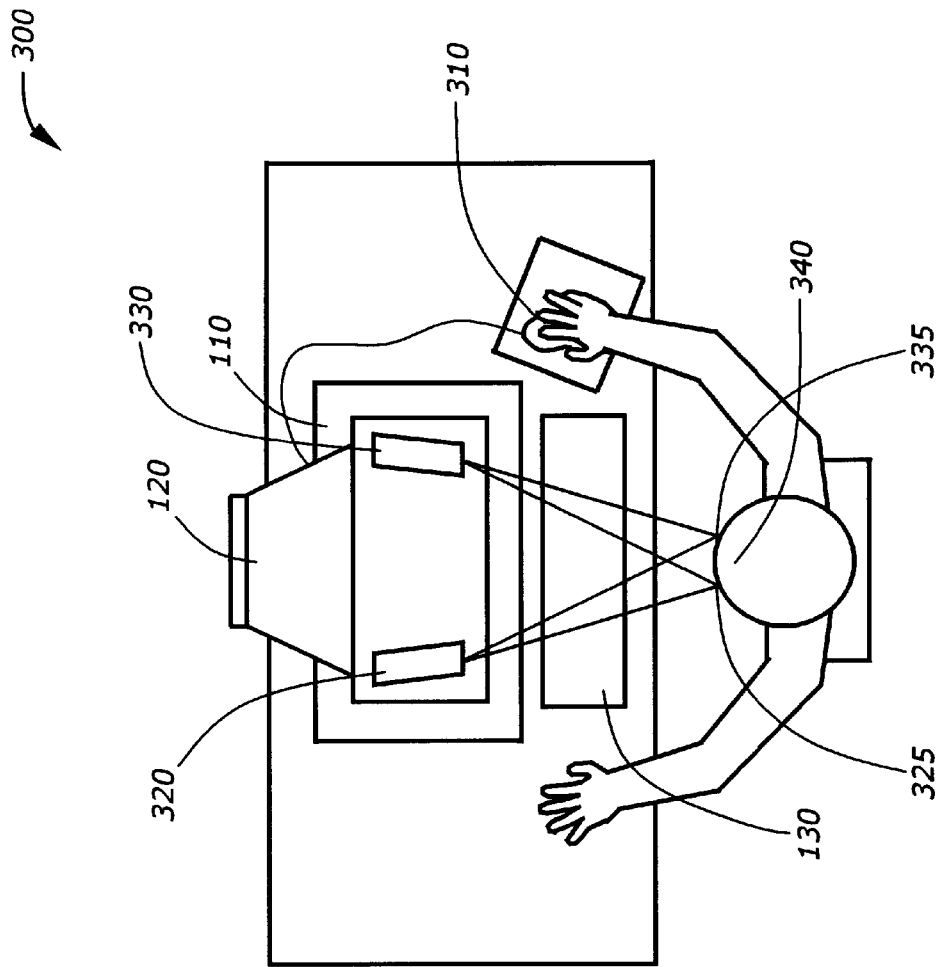
FIG. 3 is a diagram illustrating a 3-D stereo vision for inputting facial expressions and/or eye tracking according to one embodiment of the invention.

FIG. 3 is a diagram illustrating a 3-D stereo vision system 300 for inputting facial expressions and/or eye tracking according to one embodiment of the invention. The system 300 includes the computer 110, the display monitor 120, the keyboard 130, an input entry device 310, two cameras 320 and 330 targeting a user's head 340 and/or user's left and right eyes 325 and 335.

The computer 110, the display monitor 120, and the keyboard 130 are described earlier. The input entry device 310 is any input entry device such as mouse, tablet digitizer, pen stylus, track ball, etc.

The two cameras 320 and 330 are any two cameras that can capture the video images in real time. In one embodiment, the two cameras 320 and 330 are configured to operate in normal ambient light. The two cameras are positioned in such a way that they can capture the images of the user's eyes 325 and 335 or user's head 340 within their field of view. In one embodiment, the two cameras 320 and 330 are mounted on top of the display monitor 120 pointing toward the user's head in a stereo geometry.

In this 3-D system, the 3-D input data are provided by the movement of the user's eyes or head. By tracking the eye or head movement, the system will determine the view point of the user and process the 3-D images accordingly. In a typical application, the image displayed on the display monitor 120 represents the scene as seen by the user. When the user moves his or her eyes in a direction to focus on a certain location of the image, the system will display the region of interest corresponding to the location as focused by the user. Similarly, the movement of the user's head 340 also provides additional 3-D view points.

The system 300 can be configured to operate in a number of modes. In one mode, the system 300 tracks the movement of the user's eyes 325 and 335 and the user's head 340 independently. In another mode, the system tracks the movements of the user's eyes 325 and 335 and the user's head 340 in an integrated manner. For example, the user's head 340 may provide the depth and rotation parameters while the user's eyes 325 and 335 may provide the translation parameters. Yet in another mode, the system 300 may simply track the movement of the user's head 340 based on the movement of the eyes. By tracking the head movement, the system 300 may determine certain gestures or expressions. For example, the system may determine a vertical movement of the user's head 340 as a nod, indicating agreement, or a horizontal movement of the user's head 340 as a shake, indicating disagreement. In this case, special markers may be worn by the user to facilitate the detection of the movement such as eye glasses with predetermined color, shape, and type of material.

The systems shown in FIGS. 2 and 3 can be combined to provide a more complete 3-D navigation. The user can use the input unit 150 in FIG. 2 to provide normal 3-D input data and use head or eye movement in FIG. 3 to generate additional commands such as viewpoint modifications, rotation and translation of images, zoom and minification of images. In addition, the user can combine several data input entries to indicate an input action. For example, the user may use one hand in the input unit 150 to provide the normal 3-D input data and use another hand to enter another input data via a mouse or a keyboard. Examples of other additional input entry devices include a voice recognition system to process speech data, a heat sensing device, etc. Examples of other input events include clicking a mouse button, moving the mouse on the mouse pad, holding down the control key on the keyboard, uttering a command word, etc.

Figure 4:
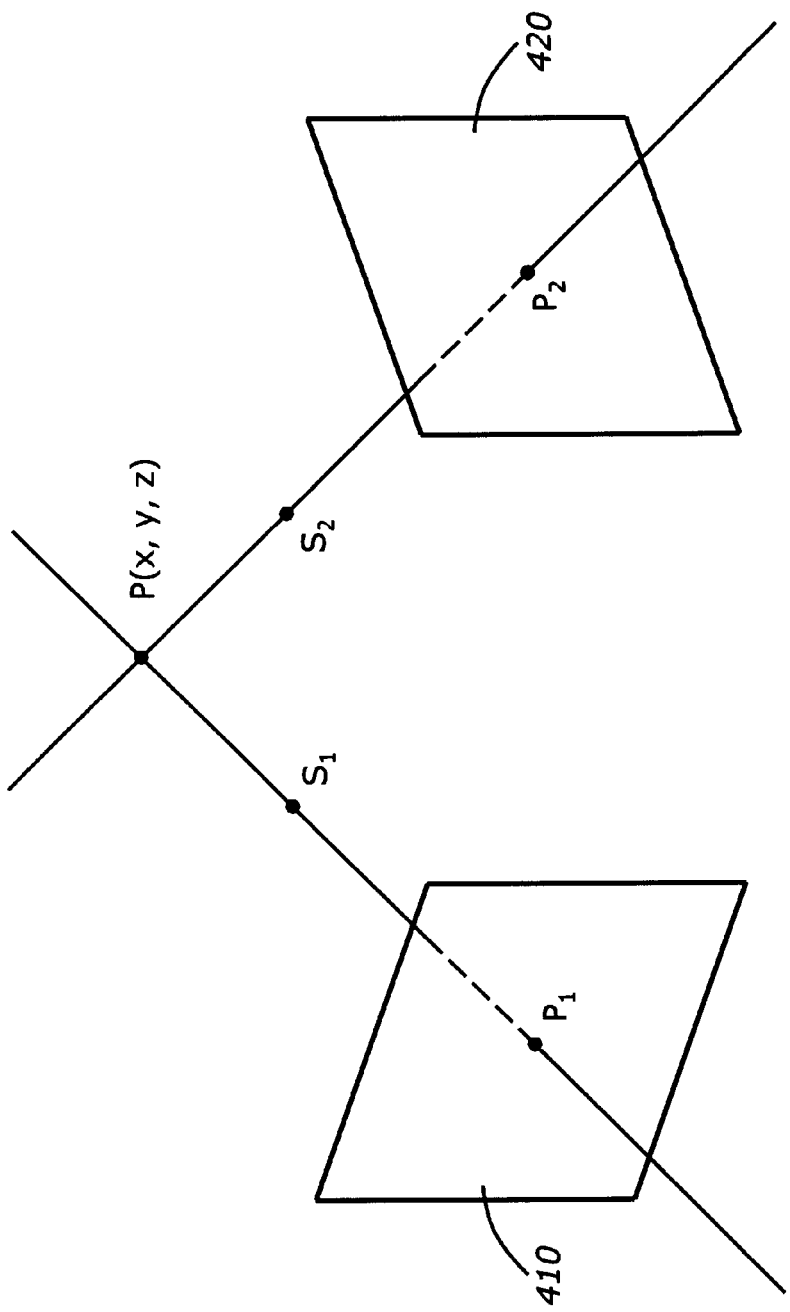
FIG. 4 is a diagram illustrating a 3-D stereo geometry for 3-D coordinate computations according to one embodiment of the invention.

FIG. 4 is a diagram illustrating a 3-D stereo geometry for 3-D coordinate computations according to one embodiment of the invention. The 3-D stereo geometry includes two point sources S1 and S2, two imaging planes 410 and 420, the object point P(x, y, z), and two image points P1 and P2.

The two point sources S1 and S2 represent the focus points of the two cameras in the stereo configuration. These are the two cameras 220 and 230 in FIG. 2, or the two cameras 320 and 330 in FIG. 3. The two imaging planes 410 and 420 are the image planes inside the corresponding cameras. The image planes 410 and 420 essentially contain the images as captured by the image sensors. These image planes therefore correspond to the images as provided by the cameras either in video or digital form.

The object P (x,y,z) is the object of interest as detected by the vision system. The object P may be the marker 240 in FIG. 2, the user's left and right eyes 325 and 335 in FIG. 3 or the user's head 340 as in FIG. 3. Although the object of interest may be of some size, it is reduced to a point for simplicity. The object point may be some interesting and stable point of the object such as the centroid, corners, tip of the marker, etc.

The two image points P1 and P2 are the images of the object P (x,y,z) as seen by the cameras. From optical geometry, the image points $P_1$ and $P_2$ are formed by projecting the object point P on the image planes 410 and 420, respectively. If the distance between the object point P and the cameras is sufficiently large compared to the focus lengths of the cameras, the position of the image points $P_1$ and $P_2$ can be estimated as the intersection points between the lines connecting the object point P to the camera focus points $S_1$ and $S_2$ and the corresponding image planes 410 and 420. To increase accuracy, the imaging geometry may be calibrated at various camera positions so that various offsets or correction factors can be pre-determined for each object position. These offsets or correction factors can later be used to adjust the values as computed by the system.

To determine the 3-D coordinates of the object point P, it is therefore necessary to determine the equation of the two lines connecting $P_1$ and $S_1$ and $P_2$ and $S_2$, and then equating the two equations to find the coordinates of the intersection point P.

Using an arbitrary 3-D coordinate system, the coordinates of $S_1$, $P_1$, $S_2$, and $P_2$ are expressed in terms of this coordinate system. Since $S_1$, $P_1$, $S_2$ and $P_2$ are known, the equations of the two lines can be obtained easily. These equations are parametric equations. Since P is the intersection point of $S_1P_1$ and $S_2P_2$, it should have the same (x,y,z) coordinates on the two lines. Equating the 3 pairs of equations in the three dimensions x, y, and z will give the solutions for the (x,y,z) coordinates of the point P.

Figure 5:
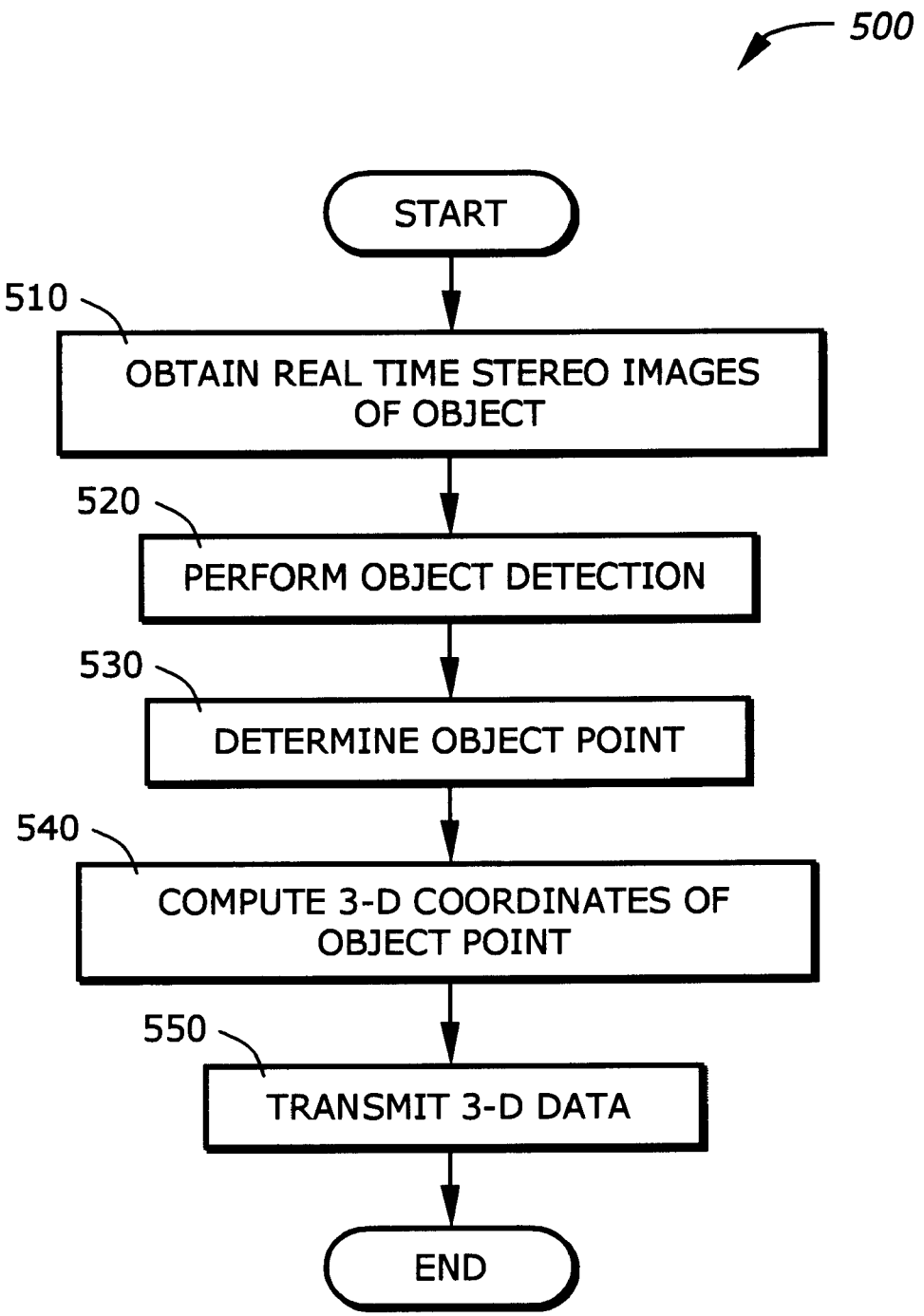
FIG. 5 is a flow diagram illustrating a process to determine the 3-D input data according to one embodiment of the invention.

FIG. 5 is a flow diagram illustrating a process 500 to determine the 3-D input data according to one embodiment of the invention.

Upon start, the process 500 obtains the real-time images of the object (Block 510). If the cameras provide the video signals, the process 500 performs video digitization to generate a digital image for each camera at each video frame (block 510). The image resolution depends on the particular implementation. Typical image resolution includes 320× 240, 512×512, 640×512, 768×512. If the cameras provide direct digital data, the image digital data are stored in buffer memory for processing.

The process 500 then performs object detection (Block 520). The object to be detected is the marker in the input unit 150 (FIG. 2), or the eyes 325 and 335 or the head 340 (FIG. 3). Object detection is performed using standard image processing techniques. Techniques such as edge detection, thresholding, color recognition, can be employed to identify the object.

The process 500 then determines the object point based on the detected object (Block 530). In some cases, the process 500 performs the operations in blocks 520 and 530 at the same time. Many techniques are available to determine the object point. Perhaps the simplest is to compute the centroid of the region of the pixels belonging to the object. Another technique is to locate points having high curvature such as corners of the object if the object is known to have sharp corners. Another technique is to determine the point having the highest edge activities. Additional processing may be performed to ensure reliable detection. Examples of these additional processes include trajectory smoothing, offset correction, calibration error adjustments, etc.

Then the process 500 determines the 3-D coordinates of the object point (Block 540). The determination of the 3-D coordinates is carried out by finding the intersection of the lines connecting the camera sources and the corresponding image object points on the image planes.

The process 500 then transmits the computed 3-D data to the system (Block 550). The process 500 then terminates.

Figure 6C:
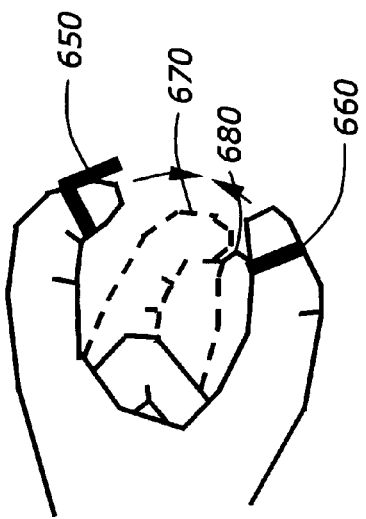
FIG. 6C is a diagram illustrating one 3-D input pattern using motion of two fingers according to one embodiment of the invention.
Figure 6B:
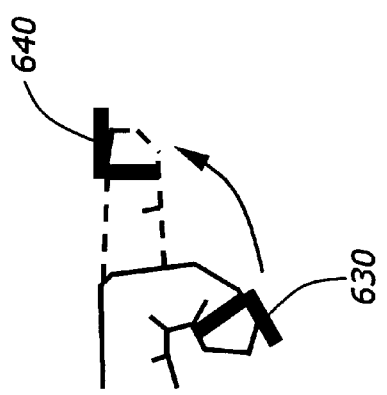
FIG. 6B is a diagram illustrating one 3-D input pattern using finger motion according to one embodiment of the invention.
Figure 6A:
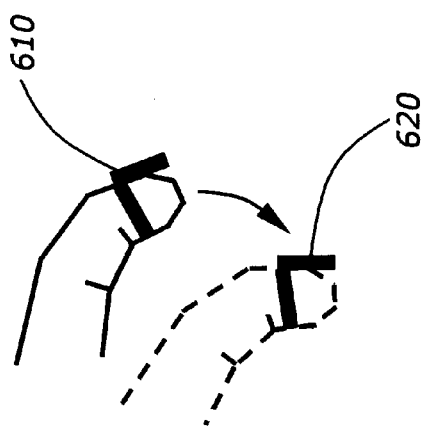
FIG. 6A is a diagram illustrating one 3-D input pattern using finger motion according to one embodiment of the invention.

FIG. 6A is a diagram illustrating one 3-D input pattern using finger motion according to one embodiment of the invention. In this pattern, the user moves its marker on his finger from position 610 to position 620. This motion pattern may correspond to a specific command or may correspond to the exact 3-D movement that the user wants to navigate in the 3-D world.

FIG. 6B is a diagram illustrating one 3-D input pattern using finger motion according to one embodiment of the invention. In this pattern, only the tip of the finger moves from position 630 to position 640. This pattern corresponds to mainly a depth motion. Again, it may be used as a specific command or an actual motion.

FIG. 6C is a diagram illustrating one 3-D input pattern using motion of two fingers according to one embodiment of the invention. This pattern involves the use of two markers at the original positions 650 and 660. Each marker may have different unique features to facilitate the detection. For example, the marker at position 650 may have a blue color while the marker at position 660 may have a red color. The pattern shows the movement of both markers to new positions 670 and 680.

The movement patterns shown in FIGS. 6A, 6B, and 6C merely illustrate some examples that the user can navigate a 3-D world using 3-D movement with a marker or markers.

The present invention therefore provides a method and apparatus for navigation in 3-D world by providing simple and efficient 3-D vision system. The technique does not require major hardware modifications and can be implemented using commercially off-the-shelf hardware.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
    moving a marker in a work place, the marker having at least one unique feature distinctive from other objects in the work place;
    sensing movement of the marker in the work place by at least two sensors in a stereo imaging geometry using the at least one unique feature of the marker to produce stereo images containing the marker;
    processing the stereo images to produce marker images; and
    computing 3-D coordinates of the marker from the marker images to produce a three-dimensional (3-D) input data using a point of intersection from the corresponding stereo images, the 3-D input data being combined with an entry from a device to indicate an input action.

2. The method of claim 1 further comprising:
    illuminating the marker by a light source.

3. The method of claim 1 wherein computing the 3-D coordinates includes:
    determining image points corresponding to the marker images;
    determining lines connecting the image points and the at least two sensors through corresponding images planes in the stereo imaging geometry; and
    determining a point of intersection between the lines, the point of intersection providing the 3-D coordinates.

4. The method of claim 3 wherein determining image points comprises:
    detecting an object representing the marker in the marker images;
    determining an object point corresponding to the object.

5. The method of claim 4 wherein the object point includes a centroid point, an edge point, and a high curvature point.

6. The method of claim 1 wherein the at least one unique feature includes a predetermined color, a predetermined shape, a predetermined size, and a predetermined relative location.

7. The method of claim 1 wherein the marker is mounted on a finger of a users' hand.

8. The method of claim 1 wherein the work place is enclosed in an input unit.

9. The method of claim 1 wherein the sensors are cameras.

10. The method of claim 1 wherein the marker includes user's eyes, user's facial expressions, and user's head.

11. An apparatus comprising:
    at least two sensors to sense movement of a marker in a stereo imaging geometry to produce stereo images containing the marker using at least one unique feature of the marker distinctive from other objects in a work place; and
    a processing element coupled to the at least two sensors to process the stereo images, the processing element computing 3-D coordinates of the marker from marker images produced by the stereo images to produce the 3-D input data using a point of intersection from the corresponding stereo images, the 3-D input data being combined with an entry from a device to indicate an input action.

12. The apparatus of claim 11 further comprising:
    a light source to illuminate the marker.

13. The apparatus of claim 11 wherein the processing element computes the 3-D coordinates by
    determining image points corresponding to the marker images;
    determining lines connecting the image points and the at least two sensors through corresponding images planes in the stereo imaging geometry; and
    determining a point of intersection between the lines, the point of intersection providing the 3-D coordinates.

14. The apparatus of claim 13 wherein the processing element further
    detects an object representing the marker in the marker images; and
    determines an object point corresponding to the object.

15. The apparatus of claim 14 wherein the object point includes a centroid point, an edge point, and a high curvature point.

16. The apparatus of claim 11 wherein the at least one unique feature includes a predetermined color, a predetermined shape, a predetermined size, and a predetermined relative location.

17. The apparatus of claim 11 wherein the marker is mounted on a finger of a users' hand.

18. The apparatus of claim 11 wherein the work place is enclosed in an input unit.

19. The apparatus of claim 11 wherein the sensors are cameras.

20. The apparatus of claim 11 wherein the marker includes user's eyes, user's facial expressions, and user's head.

21. A system comprising:
    a computer to provide display data corresponding to three-dimensional (3-D) input data entered by a user; and
    an input unit coupled to the computer to produce the 3-D input data, the input unit including:
        at least two sensors to sense movement of a marker in a stereo imaging geometry to produce stereo images containing the marker using at least one unique feature of the marker distinctive from other objects in a work place, and
        a processing element coupled to the at least two sensors to process the stereo images, the processing element computing 3-D coordinates of the marker from marker images produced by the stereo images to provide the 3-D input data to a computer using a point of intersection from the corresponding stereo images, the 3-D input data being combined with an entry from a device to indicate an input action.

22. The system of claim 21 wherein the input unit further comprises:
    a light source to illuminate the marker.

23. The system of claim 21 wherein the processing element computes the 3-D coordinates by
    determining image points corresponding to the marker images;
    determining lines connecting the image points and the at least two sensors through corresponding images planes in the stereo imaging geometry; and
    determining a point of intersection between the lines, the point of intersection providing the 3-D coordinates.

24. The system of claim 23 wherein the processing element further detects an object representing the marker in the marker images; and determines an object point corresponding to the object.

25. The system of claim 24 wherein the object point includes a centroid point, an edge point, and a high curvature point.

26. The system of claim 21 wherein the at least one unique feature includes a predetermined color, a predetermined shape, a predetermined size, and a predetermined relative location.

27. The system of claim 21 wherein the marker is mounted on a finger of a users' hand.

28. The system of claim 21 wherein the marker includes user's eyes, user's facial expressions, and user's head.

29. The system of claim 21 further comprises an entry device coupled to the computer to provide an input entry entered by the user, the input entry being combined with the 3-D input data to define an input action.

30. The method of claim 1 wherein the device is one of a keyboard, a mouse, a voice recognition system, and a heat sensing element.

31. The method of claim 30 wherein the entry is generated by one of clicking a mouse button, moving a mouse on a mouse pad, holding down a control key on a keyboard, and uttering a command word.

32. The apparatus of claim 11 wherein the device is one of a keyboard, a mouse, a voice recognition system, and a heat sensing element.

33. The apparatus of claim 32 wherein the entry is generated by one of clicking a mouse button, moving a mouse on a mouse pad, holding down a control key on a keyboard, and uttering a command word.

34. The system of claim 21 wherein the device is one of a keyboard, a mouse, a voice recognition system, and a heat sensing element.

35. The system of claim 34 wherein the entry is generated by one of clicking a mouse button, moving a mouse on a mouse pad, holding down a control key on a keyboard, and uttering a command word.

* * * * *